United States Patent
Lee et al.

(10) Patent No.: US 11,088,774 B2
(45) Date of Patent: Aug. 10, 2021

(54) METHOD AND APPARATUS FOR WAVELENGTH ALLOCATION FOR BIDIRECTIONAL OPTICAL ACCESS

(71) Applicant: ELECTRONICS AND TELECOMMUNICATIONS RESEARCH INSTITUTE, Daejeon (KR)

(72) Inventors: Han Hyub Lee, Daejeon (KR); Hwan Seok Chung, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/876,439

(22) Filed: May 18, 2020

(65) Prior Publication Data
US 2020/0366399 A1    Nov. 19, 2020

(30) Foreign Application Priority Data

May 16, 2019   (KR) .................. 10-2019-0057498
May 18, 2020   (KR) .................. 10-2020-0058850

(51) Int. Cl.
 H04J 14/02      (2006.01)
 H04B 10/27     (2013.01)
(52) U.S. Cl.
 CPC .......... H04J 14/0227 (2013.01); H04B 10/27 (2013.01)
(58) Field of Classification Search
 CPC ................ H04J 14/0227; H04B 10/27
 USPC ................................................ 398/79
 See application file for complete search history.

(56) References Cited

U.S. PATENT DOCUMENTS

| | | | |
|---|---|---|---|
| 2012/0020666 A1* | 1/2012 | Luo | H04J 14/025 398/68 |
| 2013/0209094 A1 | 8/2013 | Jeong et al. | |
| 2014/0029951 A1* | 1/2014 | Handelman | H04B 10/506 398/91 |
| 2014/0161446 A1 | 6/2014 | Lee et al. | |
| 2014/0219660 A1* | 8/2014 | Zhu | H04J 14/0247 398/67 |
| 2015/0338578 A1* | 11/2015 | Bickham | G02B 6/26 385/15 |
| 2018/0123723 A1 | 5/2018 | Lee et al. | |

OTHER PUBLICATIONS

Vincent Houtsma et al., "Recent Progress on Standardization of Next Generation 25, 50 and 100G EPON", Journal of Lightwave Technology, Mar. 2017.

(Continued)

Primary Examiner — Mohammad R Sedighian
(74) Attorney, Agent, or Firm — LRK Patent Law Firm

(57) ABSTRACT

A method and apparatus for wavelength allocation for bidirectional optical access. The wavelength allocation method sets a first central wavelength for the optical path terminal to perform downstream transmission to the optical network unit, and a second central wavelength for the optical network unit to perform upstream transmission to the optical network terminal. At this time, the first center wavelength and the second center wavelength are separated by a predetermined wavelength interval, and the first center wavelength is set larger than the second center wavelength.

2 Claims, 7 Drawing Sheets

| | Optical Transceiver 1 | Optical Transceiver 2 | Optical Transceiver 3 |
|---|---|---|---|
| Downstream Center Wavelength (range) (nm) | 1320-1340 | 1306-1322 | 1306-1322 |
| Upstream Center Wavelength (range) (nm) | 1260-1280 | 1281-1297 | 1281-1297 |
| BOSA | Focusing Beam Optics | Focusing Beam Optics | Collimated Beam Optics |

(56) References Cited

OTHER PUBLICATIONS

Han Hyub Lee el al., "Wavelength plan for 25GBASE-BR", IEEE 802.3 Interim Meeting, May 20, 2019.
Naruto Tanaka et al., "Feasibility of 25G DML transmission", IEEE P802.3ca, 100G-EPON Task Force Meeting, Whistler, May 24-25, 2016.

* cited by examiner

FIG. 6

| | Optical Transceiver 1 | Optical Transceiver 2 | Optical Transceiver 3 |
|---|---|---|---|
| Downstream Center Wavelength (range) (nm) | A-B | C-D | E-F |
| Upstream Center Wavelength (range) (nm) | G-H | I-J | K-L |

FIG. 7

| BOSA | Optical Transceiver 1 | Optical Transceiver 2 | Optical Transceiver 3 |
|---|---|---|---|
| Downstream Center Wavelength (range) (nm) | 1320-1340 | 1306-1322 | 1306-1322 |
| Upstream Center Wavelength (range) (nm) | 1260-1280 | 1281-1297 | 1281-1297 |
| | Focusing Beam Optics | Focusing Beam Optics | Collimated Beam Optics |

METHOD AND APPARATUS FOR WAVELENGTH ALLOCATION FOR BIDIRECTIONAL OPTICAL ACCESS

CROSS-REFERENCE TO RELATED APPLICATION(S)

This application claims the benefit of Korean Patent Application No. 10-2019-0057498, filed on May 16, 2019, and No. 10-2020-0058850, filed on May 18, 2020, in the Korean Intellectual Property Office, the disclosure of which is incorporated herein by reference.

BACKGROUND

1. Field of the Invention

One or more example embodiments relate to a method and apparatus for wavelength allocation for bidirectional optical access, and more particularly, wavelength allocation for optical transceiver joining the bidirectional optical access.

2. Description of Related Art

In an Ethernet-based bidirectional optical access network, the optical transceiver needs to perform both downstream transmission and upstream transmission. In this case, it is required to set the center wavelength for downstream transmission and the center wavelength for upstream transmission, respectively.

At this time, the inside of the optical transceiver may include both a laser diode for transmitting the optical signal and a photodiode for receiving the optical signal. Loss may occur in the process of filtering optical signals transmitted or received through downstream transmission and upstream transmission. In addition, there may be a penalty when the optical signal is transmitted through the optical fiber.

Therefore, it is necessary to allocate a central wavelength for transmission and reception of an optical signal in consideration of penalty and loss in downstream transmission and upstream transmission in an optical transceiver.

SUMMARY

The present invention is a wavelength allocation method and apparatus to allocate a central wavelength for upstream transmission and downstream transmission of an optical transceiver, by considering both the penalty generated in the optical fiber and the loss existing inside the optical transceiver, then it can increase the accuracy of the optical transceiver.

According to an aspect, there is provided a method for wavelength allocation. The optical line terminal may set the first center wavelength for downstream transmission to the optical network unit. And, the optical line terminal can allocate the first central wavelength to the first optical signal for downstream transmission. Similarly, the optical network unit may set a second center wavelength different from the first center wavelength allocated to the first optical signal by the optical line terminal for downstream transmission. The optical network unit may allocate a second central wavelength to the second optical signal for upstream transmission to the optical line terminal.

At this time, the first central wavelength may be separated from the second central wavelength allocated to the second optical signal transmitted through upstream transmission from the optical network unit by a predetermined interval. The optical line terminal may provide the first optical signal to which the first central wavelength is allocated through the single mode optical fiber to the optical network unit through downstream transmission. At this time, the first center wavelength may be allocated larger than the second center wavelength.

The optical line terminal may provide the first optical signal to the optical network unit through downstream transmission according to any one of 10 Gb/s, 25 Gb/s, or 50 Gb/s. Then, the optical line terminal operates in an operating range of 10 km, 20 km, or 40 km, and a range of the first center wavelength may be determined based on the operating range.

In addition, the optical network unit may provide the second optical signal to the optical line terminal by upstream transmission according to any one of 10 Gb/s, 25 Gb/s, or 50 Gb/s. Then, the optical network unit operates in an operating range of 10 km, 20 km, or 40 km, and a range of the second central wavelength may be determined based on the operating range.

For example, the optical line terminal may set a first central wavelength for downstream transmission within a range of 1320 nm-1340 nm when operating at a date rate of 10 Gb/s and an operating range of 10 km, 20 km, or 40 km. In addition, when operating at a date rate of 10 Gb/s and an operating range of 10 km, 20 km, or 40 km, the optical network unit may set a second central wavelength for upstream transmission within a range of 1260 nm-1280 nm.

In addition, when operating at a date rate of 25 Gb/s or 50 Gb/s and an operating range of 10 Km, the optical line terminal may set a first center wavelength for downstream transmission within a range of 1320 nm-1340 nm. In addition, when operating at a date rate of 25 Gb/s or 50 Gb/s and an operating range of 20 Km or 40 km, the optical line terminal may set a first center wavelength for downstream transmission within a range of 1306 nm-1322 nm.

Then, the optical network unit may set the second center wavelength for upstream transmission to a range of 1260 nm to 1280 nm when operating at a date rate of 25 Gb/s or 50 Gb/s and an operating range of 10 Km. In addition, the optical network unit may set a second center wavelength for upstream transmission to a range of 1281 nm-1297 nm when operating at a date rate of 25 Gb/s or 50 Gb/s and an operating range of 20 Km or 40 km.

As another example, the optical line terminal may set the first center wavelength for downstream transmission to 1310 nm when operating at a 25 Gb/s date rate and an operating range of 10 Km, 20 Km, and 40 Km. In addition, when the optical network unit operates at a 25 Gb/s data rate and an operating range of 10 Km, 20 Km, and 40 Km, the second center wavelength for upstream transmission may be set to 1270 nm.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 6 is a diagram illustrating an example of a central wavelength for each optical transceiver for the downstream transmission and the upstream transmission according to an embodiment of the present invention; and FIG. 7 is a diagram illustrating an example of a central wavelength for upstream transmission and downstream transmission allocated to a 25GBASE optical transceiver having an operating range of 10 km, 20 km, and 40 km according to an embodiment of the present invention.

DETAILED DESCRIPTION OF THE INVENTION

Figure 1:
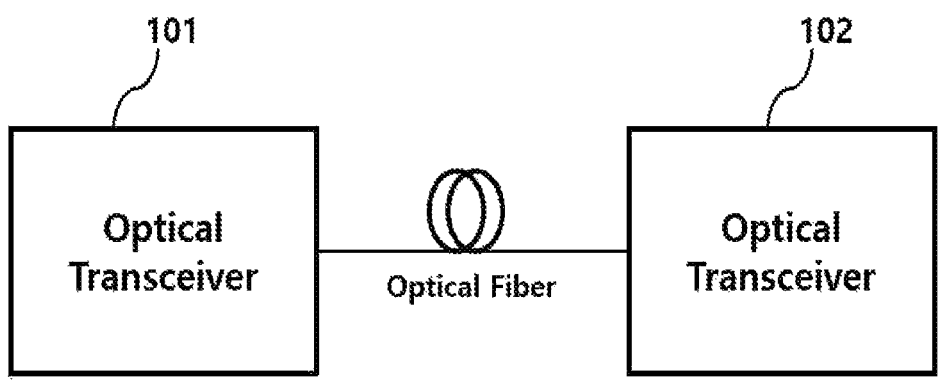
FIG. 1 is a diagram illustrating the operation of the optical transceiver according to an example embodiment of the present invention.

Hereinafter, example embodiments will be described in detail with reference to the accompanying drawings. The scope of the right, however, should not be construed as limited to the example embodiments set forth herein. Like reference numerals in the drawings refer to like elements throughout the present disclosure.

Various modifications may be made to the example embodiments. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

The terminology used herein is for the purpose of describing particular embodiments only and is not intended to be limiting. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Regarding the reference numerals allocated to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

Hereinafter, the example embodiments will be described in detail with reference to the accompanying drawings.

FIG. 1 is a diagram illustrating a sound event detection apparatus for detecting a sound event according to an example embodiment.

Technology for detecting and recognizing a sound event may be applied to various fields such as environment context recognition, dangerous situation recognition, media contents recognition, and wired and wireless communication situation analysis in real life.

Referring to FIG. 1, a sound event detection apparatus 120 for detecting a sound event from a sound signal may include a processor 121 and a memory 123. The memory 123 may include computer-readable instructions. When the instructions are executed by the processor 121, the processor 121 may detect the sound event from the sound signal by applying a trained neural network.

FIG. 1 is a diagram illustrating the operation of the optical transceiver according to an example embodiment of the present invention.

Referring to FIG. 1, two optical transceivers 101 and 102 connected through an optical fiber for bidirectional optical access are illustrated. At this time, the optical transceiver 101 may be an optical line terminal (OLT), and the optical transceiver 102 may be an optical network unit (ONU). In addition, the optical fiber may be a single-mode optical fiber.

The optical transceivers 101 and 102 are capable of bidirectional transmission and can operate at a data rate of 10 Gb/s, 25 Gb/s, or 50 Gb/s. In addition, the optical transceivers 101 and 102 may be classified into 10 km, 20 km, 40 km, or 40 km or more according to an operating range such as transmission distance.

According to this classification, the optical transceivers 101 and 102 may be classified into 10GBASE-BR10, 10GBASE-BR20, 10GBASE-BR40, and 10GBASE-BR40+ in the physical layer according to the operating range when the data rate is 10 Gb/s. And, when the date rate is 20 Gb/s, the optical transceivers 101 and 102 may be divided into 25GBASE-BR10, 25GBASE-BR20, 25GBASE-BR40, and 25GBASE-BR40+ in the physical layer according to the operating range. In addition, when the data rate is 50 Gb/s, the optical transceivers 101 and 102 are divided into 50GBASE-BR10, 50GBASE-BR20, 50GBASE-BR40, and 50GBASE-BR40+ in the physical layer (PHY) according to the operating range.

In the optical transceivers 101 and 102, x of BRx means an operating range. In the case of BR10, the operating range may be 2 m-10 km, in the case of BR20, the operating range may be 2 m-20 km, and in the case of BR40 and BR40+, the operating range may be 2 m-40 km. Further, the optical transceivers 101 and 102 may be divided into downstream and upstream, respectively, according to the identifier D or U. The identifier D is for the OLT PHY, and the identifier U is for the ONU PHU.

For example, 25GBASE-BR10-D means an OLT of a physical layer that supports a transmission distance that is a minimum operating range of 10 km through a single-mode fiber for the downstream transmission. In addition, 25GBASE-BR25-U means an ONU of a physical layer that supports a transmission distance that is a minimum operating range of 25 km through a single mode fiber for the upstream transmission.

For downstream transmission, the optical transceiver 101 may perform a transmission of the optical signal into the optical transceiver 102, and the optical transceiver 102 may perform a reception of the optical signal from the optical transceiver 101. Conversely, for upstream transmission, the optical transceiver 101 may perform a reception of the optical signal from the optical transceiver 102, and the optical transceiver 102 may perform a transmission of the optical signal into the optical transceiver 101.

The present invention describes wavelength allocation for optical transceivers 101 and 102. The optical transceiver 101 can set a central wavelength for downstream transmission to the optical transceiver 102. The central wavelength for downstream transmission may be allocated to an optical signal output from the optical transceiver 101 to the optical transceiver 102. Then, the optical transceiver 102 may set the center wavelength for upstream transmission to the optical transceiver 101. The central wavelength for upstream transmission may be allocated to an optical signal output from the optical transceiver 102 to the optical transceiver 101.

At this time, center wavelength allocation for the optical transceivers 101 and 102 may be determined in consideration of penalty and loss for the optical transceivers 101 and 102. Hereinafter, the central wavelength allocation for the optical transceivers 101 and 102 will be described in more detail.

In the present invention, an optical transceiver supporting 25G date rate is mainly described, but is not limited thereto. The present invention provides a central wavelength plan for downstream transmission and upstream transmission in consideration of characteristics of a light source, an optical fiber, and the like used in the optical transceivers 101 and 102.

In one example, the light source refers to the type of laser diode, and may include Uncooled DFB LD or Cooled EML. Further, the standard of the optical filter used in the optical transceiver may be a wavelength separation filter or a wavelength selection filter. According to the present invention, the center wavelength for downstream transmission or upstream transmission may be determined in consideration of the specifications of the optical filter. For example, in order to transmit a 25 Gb/s optical signal using Non Return to Zero (NRZ) modulation 20 km, it is necessary to use a wavelength in the 1300 nm band with less chromatic dispersion of the optical fiber.

The above-mentioned description can be applied to an optical line terminal corresponding to the optical transceiver 101 and an optical network unit corresponding to the optical transceiver 102.

The optical line terminal may set the first center wavelength for downstream transmission to the optical network unit. And, the optical line terminal can allocate the first central wavelength to the first optical signal for downstream transmission. Similarly, the optical network unit may set a second center wavelength different from the first center wavelength allocated to the first optical signal by the optical line terminal for downstream transmission. The optical network unit may allocate a second central wavelength to the second optical signal for upstream transmission to the optical line terminal.

At this time, the first central wavelength may be separated from the second central wavelength allocated to the second optical signal transmitted through upstream transmission from the optical network unit by a predetermined interval. The optical line terminal may provide the first optical signal to which the first central wavelength is allocated through the single mode optical fiber to the optical network unit through downstream transmission. At this time, the first center wavelength may be allocated larger than the second center wavelength.

The optical line terminal may provide the first optical signal to the optical network unit through downstream transmission according to any one of 10 Gb/s, 25 Gb/s, or 50 Gb/s. Then, the optical line terminal operates in an operating range of 10 km, 20 km, or 40 km, and a range of the first center wavelength may be determined based on the operating range.

In addition, the optical network unit may provide the second optical signal to the optical line terminal by upstream transmission according to any one of 10 Gb/s, 25 Gb/s, or 50 Gb/s. Then, the optical network unit operates in an operating range of 10 km, 20 km, or 40 km, and a range of the second central wavelength may be determined based on the operating range.

For example, the optical line terminal may set a first central wavelength for downstream transmission within a range of 1320 nm-1340 nm when operating at a date rate of 10 Gb/s and an operating range of 10 km, 20 km, or 40 km. In addition, when operating at a date rate of 10 Gb/s and an operating range of 10 km, 20 km, or 40 km, the optical network unit may set a second central wavelength for upstream transmission within a range of 1260 nm-1280 nm.

In addition, when operating at a date rate of 25 Gb/s or 50 Gb/s and an operating range of 10 Km, the optical line terminal may set a first center wavelength for downstream transmission within a range of 1320 nm-1340 nm. In addition, when operating at a date rate of 25 Gb/s or 50 Gb/s and an operating range of 20 Km or 40 km, the optical line terminal may set a first center wavelength for downstream transmission within a range of 1306 nm-1322 nm.

Then, the optical network unit may set the second center wavelength for upstream transmission to a range of 1260 nm to 1280 nm when operating at a date rate of 25 Gb/s or 50 Gb/s and an operating range of 10 Km. In addition, the optical network unit may set a second center wavelength for upstream transmission to a range of 1281 nm-1297 nm when operating at a date rate of 25 Gb/s or 50 Gb/s and an operating range of 20 Km or 40 km.

As another example, the optical line terminal may set the first center wavelength for downstream transmission to 1310 nm when operating at a 25 Gb/s date rate and an operating range of 10 Km, 20 Km, and 40 Km. In addition, when the optical network unit operates at a 25 Gb/s data rate and an operating range of 10 Km, 20 Km, and 40 Km, the second center wavelength for upstream transmission may be set to 1270 nm.

Figure 2:
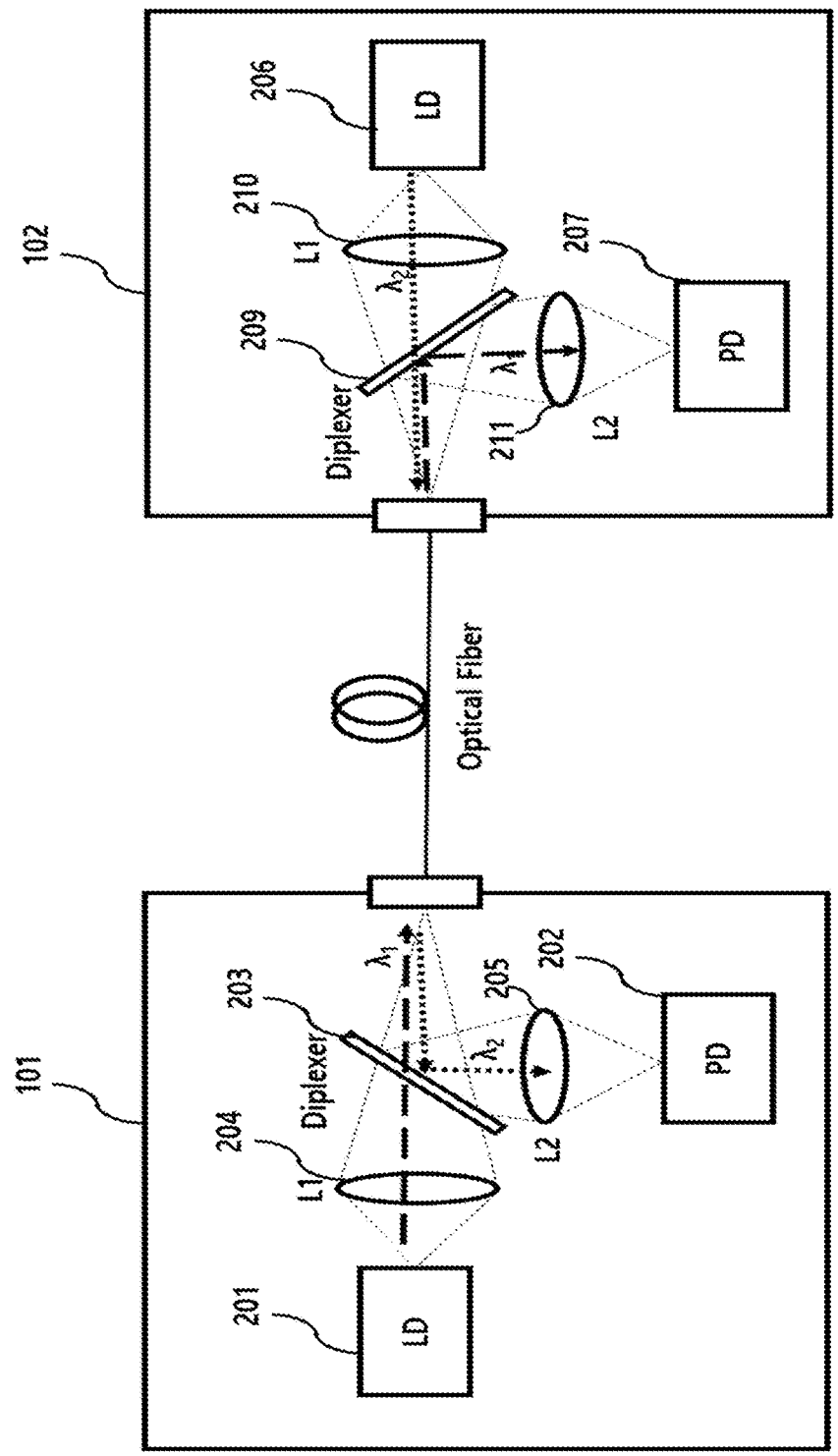
FIG. 2 is a diagram illustrating the internal structure of an optical transceiver according to an embodiment of the present invention.

FIG. 2 is a diagram illustrating the internal structure of an optical transceiver according to an embodiment of the present invention;

Referring to FIG. 2, an example of the internal structure of each of the optical transceivers 101 and 102 for bidirectional Ethernet transmission is shown. As described above, the optical transceiver 101 may correspond to an optical line terminal, and the optical transceiver 102 may correspond to an optical network unit.

The optical transceiver 101 includes the laser diode (LD) 201, the lenses 204, 205, a diplexer 203, which is a filter that transmits or reflects optical beam corresponding to the optical signal according to a wavelength, and a photodiode 202 which detects the optical signal. Similarly, the optical transceiver 102 may include a laser diode 206, a photodiode 207, lenses 209, 201, and a diplexer 208 similar to the optical transceiver 101.

The optical transceivers 101 and 102 are BOSA (Bidirectional Optical Sub-Assemblies) structure including Transmission Optical Sub-Assemblies (TOSA) corresponding to laser diodes for transmitting the optical signals and Receiving Optical Sub-Assemblies (ROSA) corresponding to photodiodes for receiving optical signals. According to an example, the laser diodes 201 and 206 which are light sources may be an electro-absorption modulated laser (EML) or a direct modulated laser (DML). In addition, the photodiodes 202 and 207 may be a pin photodiode (Pin-PD) or an avalanche photodiode (Avalanche PD).

As shown in FIG. 2, when the optical transceiver 101 and the optical transceiver 102 transmit and receive optical signals through a single mode optical fiber, power penalty due to chromatic dispersion in the optical fiber and excess loss when focusing the beam at and diplexer 203 and 208 may occur. Thus, the center wavelengths for the optical transceiver 101 and the optical transceiver 102 may be set in consideration of the power penalty and excess loss.

The wavelength λ1 means the central wavelength for the optical transceiver 101 to downstream transmit to the optical transceiver 102. In addition, the wavelength λ2 refers to a central wavelength for the optical transceiver 102 to upstream transmission to the optical transceiver 101.

As described above, in the present invention, (i) a center wavelength for upstream transmission or downstream transmission may be allocated in consideration of the type of light source used in the optical transceivers 101 and 102. In one example, the present invention is an operating wavelength of a direct modulation laser (DML) and an external modulation laser (e.g., field absorption modulation laser (EML)) can be set individually to minimize the transmission penalty of the optical signal that may be caused by the color dispersion of the optical fiber.

For example, assuming that both EML/DML are used for downstream transmission, a wavelength band in which the color dispersion of the optical fiber is zero may be used as a central wavelength for downstream transmission. And, assuming that DML is used for upstream transmission, a wavelength band in which color dispersion is negative (−) may be used as a center wavelength for upstream transmission. At this time, the center wavelength for downstream transmission is set larger than the center wavelength for upstream transmission.

In addition, according to the present invention, it is possible to manufacture the optical transceiver 101, 102 with BOSA structure at low cost by considering the specifications of the diplexers 203, 208 used in the optical transceivers 101, 102 for downstream transmission or upstream transmission. At this time, the filter applied to the diplexers 203 and 208 is arranged so that the center wavelength for downstream transmission and the center wavelength for upstream transmission are spaced apart by a preset wavelength interval, then the optical signal passed through the diplexer can be separated more easily. And, the center wavelength for downstream transmission is set larger than the center wavelength for upstream transmission.

At this time, as the preset wavelength interval between the center wavelength for upstream transmission and the center wavelength for downstream transmission increases, the manufacturing cost of the filter applied to the diplexers 203 and 208 may be lowered, then a price of the optical transceiver with the BOSA structure can be lowered. However, it is necessary to determine a predetermined wavelength interval between the center wavelength for upstream transmission and the center wavelength for downstream transmission in consideration of the transmission penalty of the optical signal generated due to the color dispersion generated in the optical fiber.

In addition, the present invention proposes a diplexer that performs collimated beam optics, not focused beam optics, for 25GBASE-BR40, where excess loss is high due to the wavelength used for downstream transmission. Here, the excess loss means the ratio between the optical signal input to the diplexer and the optical signal output from the diplexer.

Figure 3:
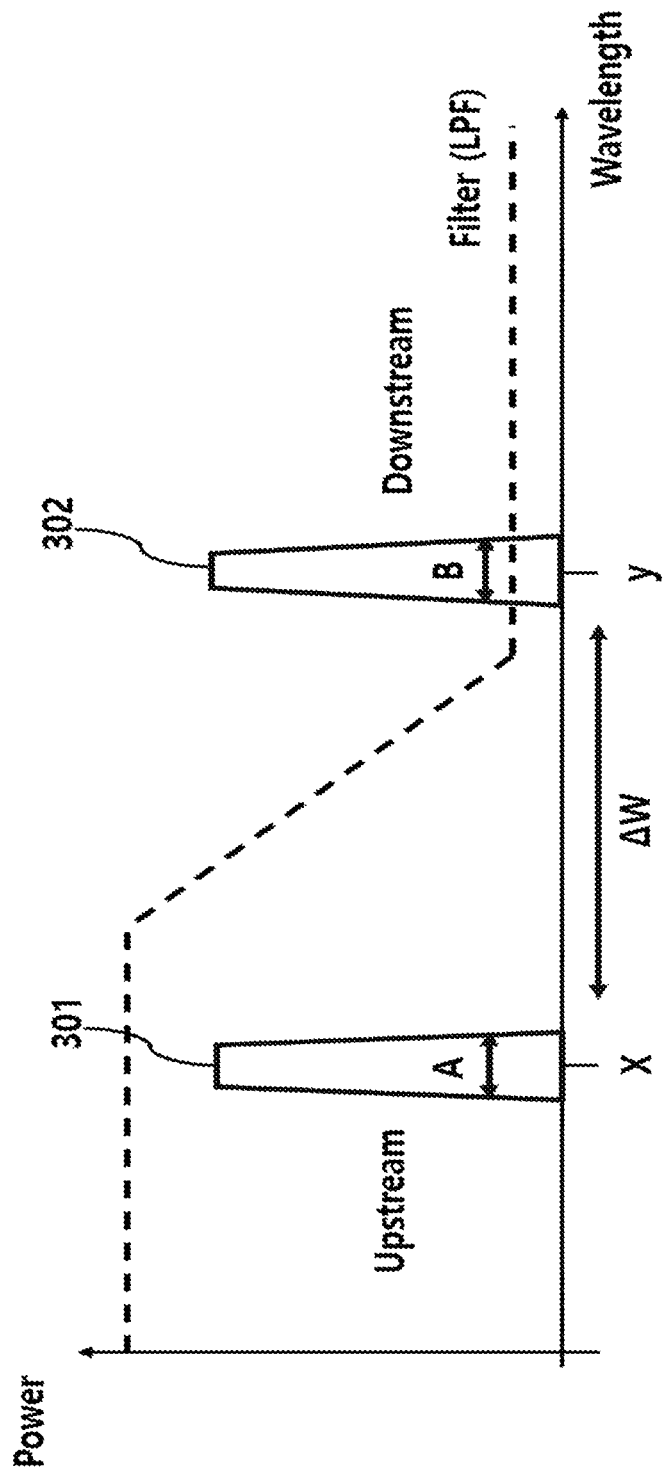
FIG. 3 is a diagram illustrating separation of a center wavelength for upstream transmission and a center wavelength for the downstream transmission according to an LPF (Low Pass Filter) according to an embodiment of the present invention.
Figure 4:
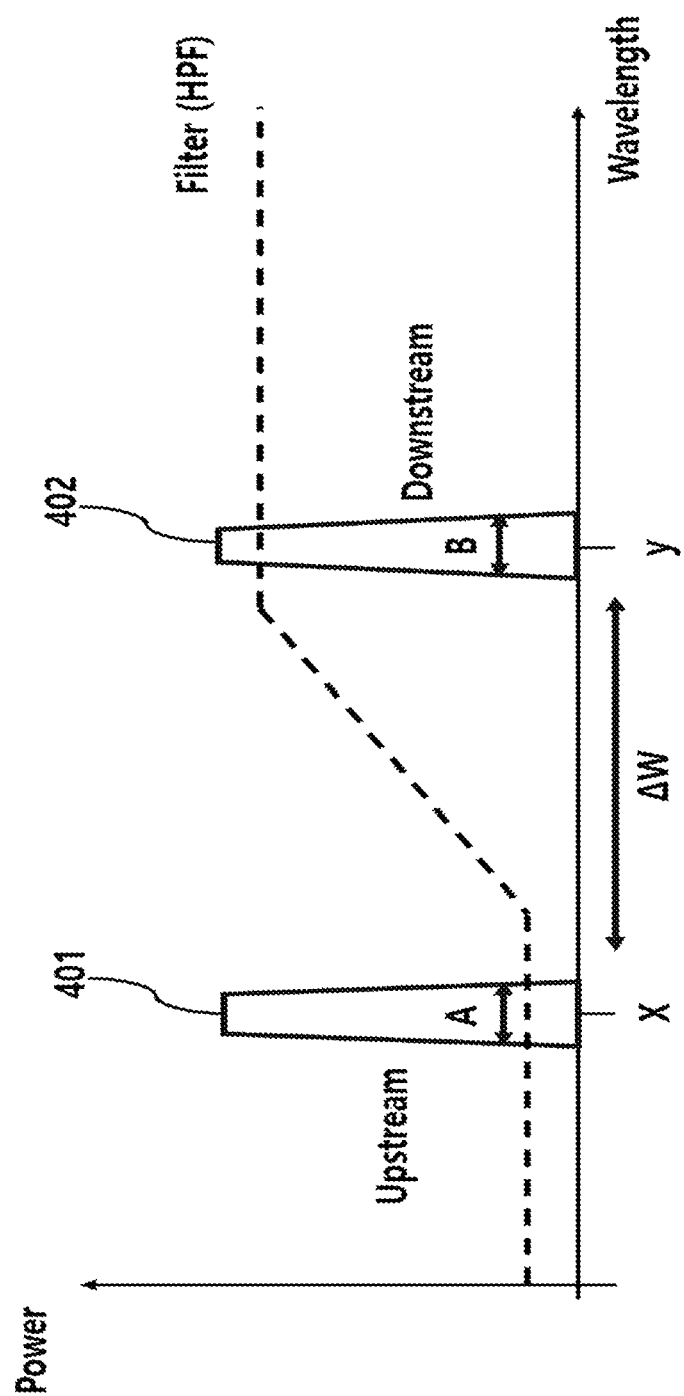
FIG. 4 is a diagram illustrating separation of a center wavelength for the upstream transmission and a center wavelength for the downstream transmission according to a HPF (high pass filter) according to an embodiment of the present invention.

FIGS. 3 and 4, which will be described below, describe a case where the center wavelength for downstream transmission and the center wavelength for upstream transmission are separated through filters applied to the diplexer, respectively. As an example, consider a case in which the center wavelength for downstream transmission uses a direct modulating laser as a light source. And, the center wavelength for upstream transmission considers the case of using a direct modulation laser and an external modulation laser (ex. Electron absorption modulation laser) as the light source.

According to FIGS. 3 and 4, the range 301, 401 of the center wavelength (X) applied to the optical signal for upstream transmission and the central wavelength applied to the optical signal for downstream transmission (The ranges 302, 402 of Y) are shown. And, referring to FIGS. 3 and 4, the center wavelength (X) applied to the optical signal for upstream transmission and the central wavelength (Y) applied to the optical signal for downstream transmission may be separated respectively at a filter applied to the diplexer. In this case, in FIG. 3, the filter applied to the diplexer is LPF (Low Pass Filter), and in FIG. 4, the filter applied to the diplexer is HPF (High Pass Filter).

To this end, as shown in FIGS. 3 and 4, the center wavelength (X) applied to the optical signal for upstream transmission and the center wavelength (Y) applied to the optical signal for downstream transmission are preset wavelength intervals (ΔW). Then, the filters described in FIGS. 3 and 4 may operate to separate or select the center wavelength (X) for upstream transmission and the center wavelength (Y) for downstream transmission.

Figure 5:
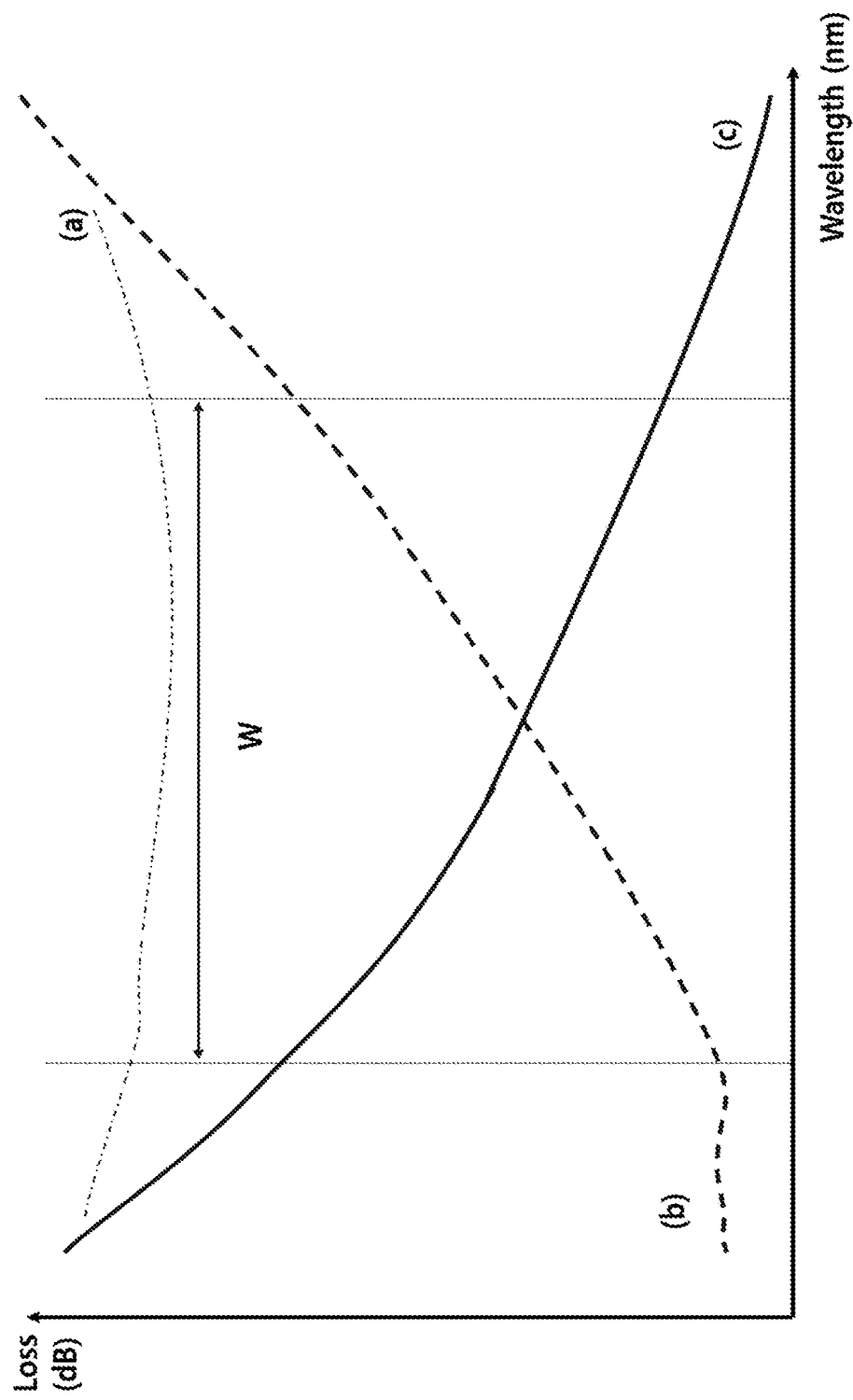
FIG. 5 is a diagram describing a range of a central wavelength for the downstream transmission and the upstream transmission according to an embodiment of the present invention.

FIG. 5 is a diagram describing a range of a central wavelength for the downstream transmission and the upstream transmission according to an embodiment of the present invention; Referring to FIG. 5, a central wavelength for downstream transmission and a central wavelength for upstream transmission are allocated within a wavelength range W. At this time, (a) is a result of combining a transmission dispersion penalty (Transmitter and Dispersion Penalty: TDP) (b) and excess insertion loss (c) that vary according to wavelength.

In the present invention, an optical transceiver that performs both downstream transmission and upstream transmission has a BOSA structure including TOSA and ROSA. When the downstream transmission and the upstream transmission are performed, a transmission dispersion penalty may occur in the optical fiber. In addition, excessive insertion loss may occur due to the diplexer focusing the optical signal to the TOSA or the ROSA according to the upstream transmission or the downstream transmission.

The transmission dispersion penalty increases as the wavelength of the optical signal increases, and the excess insertion loss decreases as the wavelength of the optical signal increases. Thus, according to the present invention, a wavelength range W in which a central wavelength for downstream transmission and a central wavelength for upstream transmission are allocated may be determined based on a minimum loss or penalty from a result of a combination of transmission dispersion penalty and excess insertion loss.

The wavelength range of the central wavelength shown in FIG. 5 may be determined differently for downstream transmission or upstream transmission. And, the range of the central wavelength for downstream transmission and the range of the central wavelength for upstream transmission may be determined by being spaced apart by a preset wavelength interval. Here, the wavelength spacing spaced between the range of the central wavelength for downstream transmission and the range of the central wavelength for upstream transmission may refer to a guard-band of the diplexer.

FIG. 6 is a diagram illustrating an example of a central wavelength for each optical transceiver for the downstream transmission and the upstream transmission according to an embodiment of the present invention.

Referring to FIG. 6, for each of the optical transceiver 1, the optical transceiver 2, and the optical transceiver 3, the range of the central wavelength for downstream transmission and the range of the central wavelength for upstream transmission are described. For example, the optical transceiver 1, the optical transceiver 2, the optical transceiver 3 is supported to the same data rate and the date rate can be determined to any one of 10 Gb/s, 25 Gb/s, 50 Gb/s.

On the other hand, the optical transceiver 1, the optical transceiver 2, the optical transceiver 3 is the same date rate is supported, but the operating range indicating the transmission distance may be determined differently. For example, optical transceiver 1 supports an operating range of 10 km, optical transceiver 2 supports an operating range of 20 km, and optical transceiver 3 supports an operating range of 40 km or more. That is, the optical transceiver 1, the optical transceiver 2, and the optical transceiver 3 supports the same date rate to each other, and may be classified according to the operating range.

Then, the central wavelength for the downstream transmission allocated for the optical transceiver 1 is determined within the wavelength range between wavelengths A and B, and the central wavelength for the upstream transmission is determined within the wavelength range between wavelengths G and H. In addition, the central wavelength for downstream transmission allocated for optical transceiver 2 is determined within the wavelength range between wavelengths C to D, and the central wavelength for upstream transmission is determined within the wavelength range between wavelengths I to J. And, the central wavelength for downstream transmission allocated for the optical transceiver 3 is determined within the wavelength range between wavelengths E and F, and the central wavelength for upstream transmission is determined within the wavelength range between wavelengths K and L.

At this time, the center wavelength for downstream transmission is allocated to be larger than the center wavelength for upstream transmission. In addition, the center wavelength for downstream transmission may be allocated by being spaced apart from the center wavelength for upstream transmission by a preset wavelength interval.

In addition, the range (A-B) of the central wavelength for downstream transmission allocated for optical transceiver 1 is the same as the range of the central wavelength (C-D or E-F) for downstream transmission allocated for optical transceiver 2 and optical transceiver 3, or it can be allocated differently. Similarly, the range of the central wavelength for upstream transmission allocated for optical transceiver 1 (G-H) is the same as or different than the range of the central wavelength for upstream transmission allocated for optical transceiver 2 and optical transceiver 3 (I-J or K-L). For example, when the date rate is 10 Gb/s, the range (A-B) of the central wavelength for downstream transmission allocated for optical transceiver 1 is same as the range (C-D or E-F) of the wavelength of the central wavelength for downstream transmission allocated for optical transceiver 2 and optical transceiver 3. However, when the date rate is 25 Gb/s or 50 Gb/s, the range (A-B) of the central wavelength for downstream transmission allocated for optical transceiver 1 is determined differently than the range (C-D or E-F) of the central wavelength for downstream transmission allocated for optical transceiver 2 and optical transceiver 3. At this time, when the date rate is 25 Gb/s or 50 Gb/s, the range (A-B) of the central wavelength for the downstream transmission allocated for the optical transceiver 1 is greater than the range (C-D or E-F) of the central wavelength for the downstream transmission allocated for the optical transceiver 2 and the optical transceiver 3.

Similarly, when the date rate is 10 Gb/s, the range (G-H) of the central wavelength for upstream transmission allocated for optical transceiver 1 is same as the range (I-J or K-L) of the central wavelength for upstream transmission allocated for optical transceiver 2 and optical transceiver 3. However, when the date rate is 25 Gb/s or 50 Gb/s, the range (G-H) of the central wavelength for upstream transmission allocated for optical transceiver 1 is determined differently than the range (I-J or K-L) of the central wavelength for upstream transmission allocated for optical transceiver 2 and optical transceiver 3. At this time, when the date rate is 25 Gb/s or 50 Gb/s, the range (G-H) of the central wavelength for upstream transmission allocated for the optical transceiver 1 is larger than the range (I-J or K-L) of the center wavelength for upstream transmission allocated for the optical transceiver 2 and the optical transceiver 3.

Further, for the same optical transceiver, the wavelength interval (bandwidth) corresponding to the range of the central wavelength for downstream transmission may be determined to be the same as the wavelength interval corresponding to the range of central wavelength for upstream transmission. However, for optical transceivers having different operating ranges, the wavelength interval (bandwidth) corresponding to the range of the central wavelength for downstream transmission may be determined to be the same or different from each other. Likewise, for optical transceivers having different operating ranges, the wavelength interval (bandwidth) corresponding to the range of the central wavelength for upstream transmission may be determined to be the same or different from each other.

For example, when the date rate is 10 Gb/s, the wavelength interval corresponding to the range (A-B) of the central wavelength for downstream transmission allocated for the optical transceiver 1 is determined to be the same as the wavelength interval corresponding to the range (C-D or E-F) of the central wavelength for the downstream transmission allocated for the optical transceiver 2 and the optical transceiver 3. However, when the date rate is 25 Gb/s or 50 Gb/s, the wavelength interval corresponding to the range (A-B) of the central wavelength for downstream transmission allocated for the optical transceiver 1 is determined differently from the wavelength interval corresponding to the range (C-D or E-F) of the central wavelength for downstream transmission allocated for the optical transceiver 2 and the optical transceiver 3. At this time, when the date rate is 25 Gb/s or 50 Gb/s, the wavelength interval corresponding to the range (A-B) of the central wavelength for downstream transmission allocated for the optical transceiver 1 is determined to be larger than the wavelength interval corresponding to the range (C-D or E-F) of the central wavelength for downstream transmission allocated for the optical transceiver 2 and the optical transceiver 3.

For example, when the date rate is 10 Gb/s, the wavelength interval corresponding to the range (G-H) of the central wavelength for upstream transmission allocated for optical transceiver 1 is determined to be the same as the wavelength interval corresponding to the range (I-J or K-L) of the central wavelength for upstream transmission allocated for optical transceiver 2 and optical transceiver 3. However, when the date rate is 25 Gb/s or 50 Gb/s, the wavelength interval corresponding to the range (G-H) of the central wavelength for upstream transmission allocated for the optical transceiver 1 is determined differently from the wavelength interval corresponding to the range (I-J or K-L) of the center wavelength for the upstream transmission allocated for the optical transceiver 2 and the optical transceiver 3. At this time, when the date rate is 25 Gb/s or 50 Gb/s, the wavelength interval corresponding to the range (A-B) of the central wavelength for upstream transmission allocated for the optical transceiver 1 is determined to be larger than the wavelength interval corresponding to the range (IJ or KL) of the central wavelength for upstream transmission allocated for the optical transceiver 2 and the optical transceiver 3.

FIG. 7 is a diagram illustrating an example of a central wavelength for upstream transmission and downstream transmission allocated to a 25GBASE optical transceiver having an operating range of 10 km, 20 km, and 40 km according to an embodiment of the present invention.

Referring to FIG. 7, in case of an optical transceiver operating at a date rate of 25 Gb/s, a central wavelength for a downstream transmission and a central wavelength for upstream transmission are illustrated according to an operating range. The central wavelength for downstream transmission is set at the optical line terminal as the optical transceiver, and the central wavelength for upstream transmission is set at the optical network unit as the optical transceiver. Since the downstream transmission and the upstream transmission are performed through the optical fiber between the optical line terminal and the optical network unit, the optical line terminal and the optical network unit can perform bidirectional optical access.

When the optical line terminal operates in a 10 km operating range at a 25 Gb/s date rate, a central wavelength for downstream transmission is set within a wavelength range of 1320-1340 nm. In addition, when the optical network unit operates in a 10 km operating range at a 25 Gb/s date rate, a central wavelength for upstream transmission is set within a wavelength range of 1260 nm-1280 nm. At this time, in the optical path terminal and the optical network unit operating at a range of 10 km with a 25 Gb/s date rate, the laser generating the optical signal may be a direct modulating laser, and the photodiode receiving the optical signal may be a Pin-PD, and a BOSA structure implemented with focusing beam optics can be used.

In addition, when the optical line terminal operates in a 20 km operating range at a 25 Gb/s date rate, a central wavelength for downstream transmission is set within a wavelength range of 1306-1322 nm. In addition, when the optical network unit operates in a 20 km operating range at a 25 Gb/s date rate, a central wavelength for upstream transmission is set within a wavelength range of 1281 nm-1297 nm. At this time, in the optical path terminal and the optical network unit operating at a range of 20 km at a 25 Gb/s date rate, the laser generating the optical signal may be a direct modulating laser, and the photodiode receiving the optical signal may be a Pin-PD, and a BOSA structure implemented with focusing beam optics can be used.

In addition, when the optical line terminal operates in a 40 km operating range at a 25 Gb/s date rate, a central wavelength for downstream transmission is set within a wavelength range of 1306-1322 nm. In addition, when the optical network unit operates in a 40 km operating range at a 25 Gb/s date rate, a central wavelength for upstream transmission is set within a wavelength range of 1281 nm-1297 nm. At this time, in the optical path terminal and the optical network unit operating in a range of 40 km at a 25 Gb/s date rate, the laser generating the optical signal may be a direct modulating laser, and the photodiode receiving the optical signal may be APD, and a BOSA structure implemented with collimated beam optics can be used. When operating in the 40 km operating range, the BOSA structure implemented with focusing beam optics is difficult to use, so for reducing the excess loss caused by the central wavelength for downstream transmission, the BOSA structure implemented with collimated beam optics may be used.

According to another embodiment, although not shown in FIG. 7, when the optical line terminal operates in an operating range of 10 km, 20 km, 40 km at a 25 Gb/s date rate, the center wavelength for downstream transmission can be set within a wavelength range of 1300 nm-1320 nm. When the optical network unit operates in an operating range of 10 km, 20 km, and 40 km at a 25 Gb/s date rate, a central wavelength for upstream transmission may be set within a wavelength range of 1260 nm-1280 nm.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The apparatus described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for wavelength allocation of an optical transceiver for bidirectional optical access, comprising:
    setting a first center wavelength for downstream transmission;
    setting a second center wavelength for upstream transmission;
    allocating the first center wavelength to a first optical signal for downstream transmissions;
    allocating the second center wavelength to a second optical signal for upstream transmission,
    wherein, when the optical transceiver is 10GBASE-BR10, 25GBASE-BR10 or 50GBASE-BR10, an operating range of the optical transceiver is 2 m-10 km,
    when the optical transceiver is 10GBASE-BR20, 25GBASE-BR20 or 50GBASE-BR20, an operating range of the optical transceiver is 2 m-20 km,
    when the optical transceiver is 10GBASE-BR40, 25GBASE-BR40 or 50GBASE-BR40, an operating range of the optical transceiver is 2 m-40 km,
    when the optical transceiver is 10GBASE-BR10, 10GBASE-BR20 or 10GBASE-BR40, wherein the first center wavelength is within a range of 1320 nm-1340 nm and the second center wavelength is within a range of 1260 nm-1280 nm,
    when the optical transceiver is 25GBASE-BR10, wherein the first center wavelength is within a range of 1320 nm-1340 nm and the second center wavelength is within a range of 1260 nm-1280 nm, when optical transceiver is 25GBASE-BR20 or 25GBASE-BR40, wherein the first center wavelength is within a range of 1306 nm-1322 nm and the second center wavelength is within a range of 1281 nm-1297 nm,
    when the optical transceiver is 50GBASE-BR10, wherein the first center wavelength is within a range of 1320 nm-1340 nm and the second center wavelength is within a range of 1260 nm-1280 nm, when optical transceiver is 50GBASE-BR20 or 50GBASE-BR40, wherein the first center wavelength is within a range of 1306 nm-1322 nm and the second center wavelength is within a range of 1281 nm-1297 nm.

2. The method of claim 1 wherein the optical transceiver provides the first optical signal to which the first center wavelength is allocated through a single mode optical fiber, wherein the first center wavelength is larger than the second center wavelength.

* * * * *